(12) United States Patent
Mundra et al.

(10) Patent No.: US 11,570,162 B1
(45) Date of Patent: Jan. 31, 2023

(54) PREVENTING PACKET LOSS DURING TIMER-BASED ENCRYPTION KEY ROLLOVER

(71) Applicant: Juniper Networks, Inc., Sunnyvale, CA (US)

(72) Inventors: Sumeet Mundra, Bangalore (IN); Guruprasad P N, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 134 days.

(21) Appl. No.: 17/218,928

(22) Filed: Mar. 31, 2021

(51) Int. Cl.
  *H04L 29/06* (2006.01)
  *H04L 9/40* (2022.01)
  *H04L 9/08* (2006.01)

(52) U.S. Cl.
  CPC .......... *H04L 63/068* (2013.01); *H04L 9/0891* (2013.01); *H04L 63/0435* (2013.01); *H04L 63/0471* (2013.01)

(58) Field of Classification Search
  CPC .................................................. H04L 63/068
  See application file for complete search history.

(56) References Cited

U.S. PATENT DOCUMENTS

| | | | |
|---|---|---|---|
| 2007/0140480 A1* | 6/2007 | Yao | H04L 9/0822 380/30 |
| 2009/0235339 A1* | 9/2009 | Mennes | H04L 9/3273 726/5 |
| 2014/0233738 A1* | 8/2014 | Chunduri | H04L 69/18 380/277 |
| 2016/0044507 A1* | 2/2016 | Agiwal | H04W 12/02 370/328 |

* cited by examiner

*Primary Examiner* — Bradley W Holder
(74) *Attorney, Agent, or Firm* — Harrity & Harrity, LLP

(57) ABSTRACT

A key server network device may install, on the key server network device, a new decryption key based on a timer-based key rollover setting and may provide, to peer network devices, messages identifying the new decryption key. The key server network device may utilize an original encryption key, to encrypt traffic, until all of the peer network devices provide acknowledgements of installation of the new decryption key. The key server network device may be configured to utilize the original encryption key based on the timer-based key rollover setting. The key server network device may generate an alarm. The alarm may include information indicating that the key server network device is waiting for the acknowledgements from one or more peer network devices and information identifying the one or more peer network devices.

20 Claims, 10 Drawing Sheets

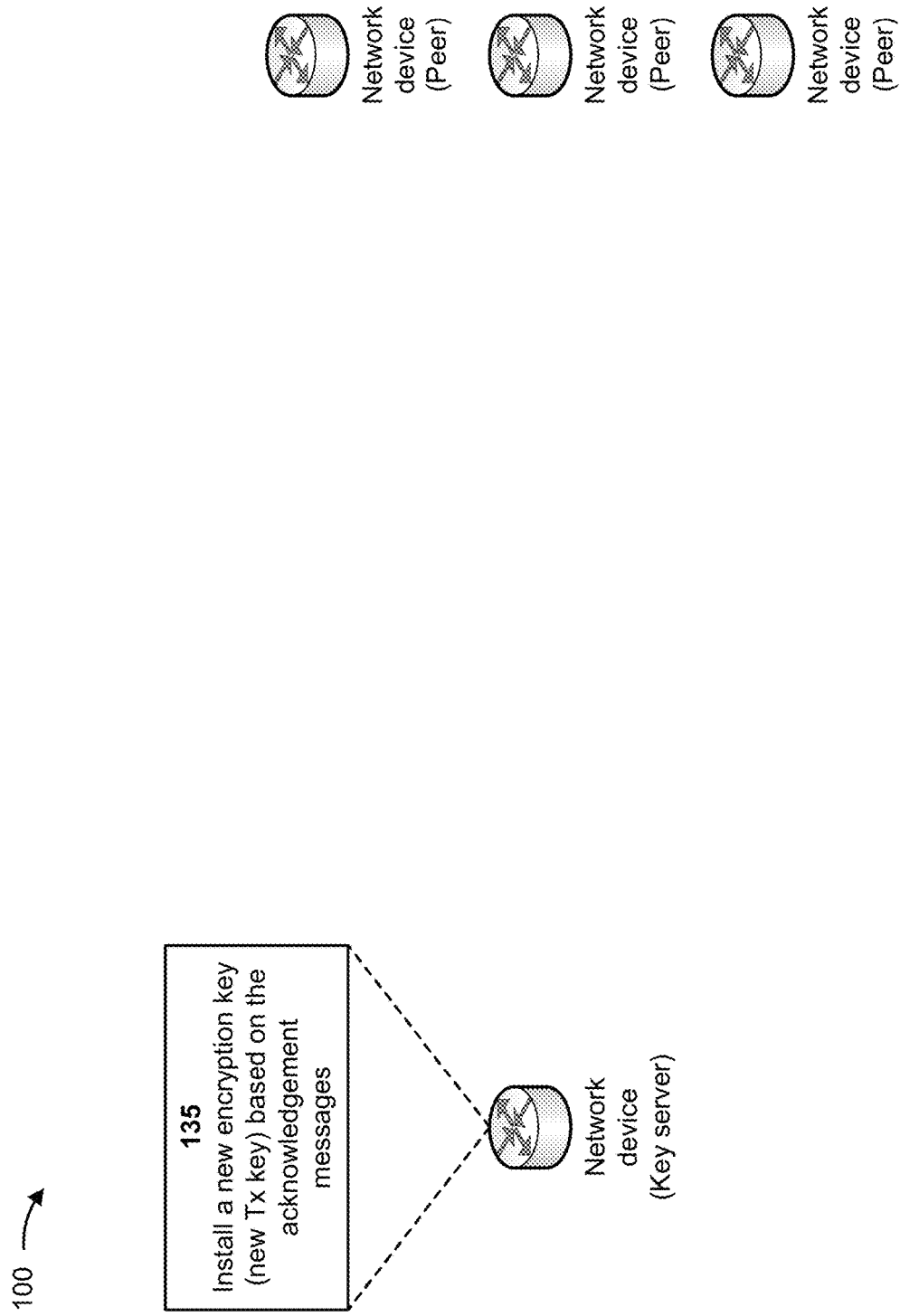

PREVENTING PACKET LOSS DURING TIMER-BASED ENCRYPTION KEY ROLLOVER

BACKGROUND

Media access control security (MACsec) is a security standard, defined by the Institute of Electrical and Electronics Engineers (IEEE) 802.1AE, that defines connectionless data confidentiality and integrity for media access independent protocols. The MACsec standard specifies a set of protocols to meet security requirements for protecting data traversing Ethernet local area networks (LANs). MACsec defines a security infrastructure to provide data confidentiality, data integrity, and data origin authentication.

SUMMARY

In some implementations, a method may include installing, on a key server network device, a new decryption key based on a timer-based key rollover setting and providing, to peer network devices, messages identifying the new decryption key. The new decryption key may be included in a pair of security keys that includes a new encryption key. Prior to installing the new decryption key, the key server network device may utilize an original pair of security keys that includes an original decryption key and an original encryption key. The method may include utilizing the original encryption key, to encrypt traffic, until all of the peer network devices provide acknowledgements of installation of the new decryption key, wherein the key server network device is configured to utilize the original encryption key based on the timer-based key rollover setting.

In some implementations, a key server network device may include one or more memories and one or more processors to install, on the key server network device, a new decryption key based on a timer-based key rollover setting and provide, to peer network devices, messages identifying the new decryption key. The new decryption key may be included in a pair of security keys that includes a new encryption key. Prior to installing the new decryption key, the key server network device may utilize an original pair of security keys that includes an original decryption key and an original encryption key. The one or more processors may utilize the original encryption key, to encrypt traffic, until all of the peer network devices provide acknowledgements of installation of the new decryption key, wherein the key server network device is configured to utilize the original encryption key based on the timer-based key rollover setting. The one or more processors may receive acknowledgement messages indicating installation of the new decryption key by all of the peer network devices and may receive new traffic to be provided to one or more peer network devices. The one or more processors may utilize, based on the acknowledgement messages, the new encryption key to encrypt the new traffic and generate new encrypted traffic and may provide the new encrypted traffic to the one or more peer network devices.

In some implementations, a non-transitory computer-readable medium may store a set of instructions that includes one or more instructions that, when executed by one or more processors of a key server network device, cause the key server network device to install, on the key server network device, a new decryption key based on a timer-based key rollover setting and provide, to peer network devices, messages identifying the new decryption key. The new decryption key may be included in a pair of security keys that includes a new encryption key. Prior to installing the new decryption key, the key server network device may utilize an original pair of security keys that includes an original decryption key and an original encryption key. The one or more instructions may utilize the original encryption key, to encrypt traffic, until all of the peer network devices provide acknowledgements of installation of the new decryption key, wherein the key server network device is configured to utilize the original encryption key based on the timer-based key rollover setting. The one or more instructions may cause the key server network device to generate an alarm when a timer, of the timer-based key rollover setting, expires before all of the peer network devices provide acknowledgements of installation of the new decryption key.

BRIEF DESCRIPTION OF THE DRAWINGS

FIGS. 1A-1F are diagrams of an example associated with preventing packet loss during timer-based encryption key rollover.

DETAILED DESCRIPTION

Figure 1A:
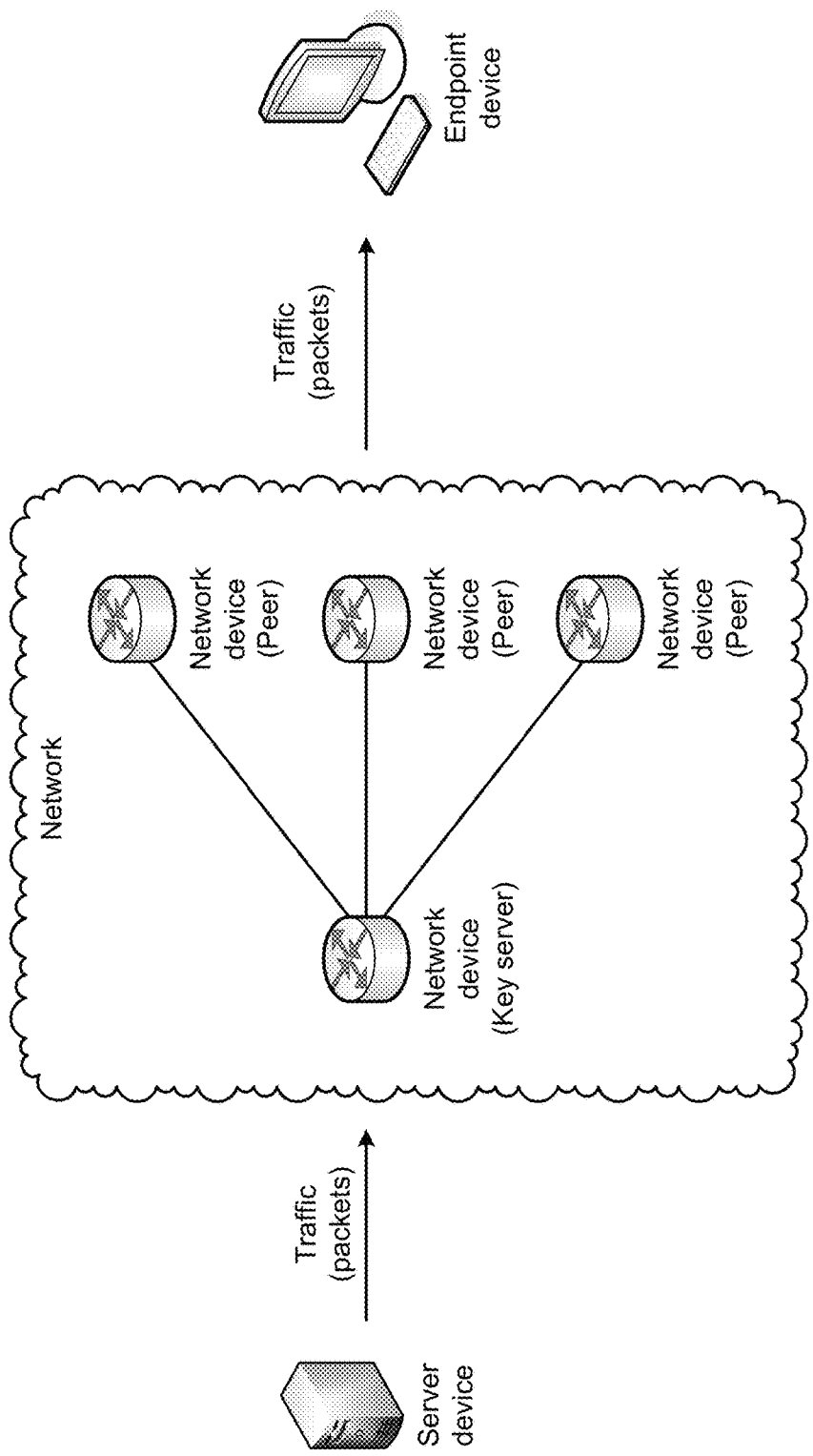

The following detailed description of example implementations refers to the accompanying drawings. The same reference numbers in different drawings may identify the same or similar elements.

Media access control security (MACsec) protocol may be used for secured communications between network devices. In some examples, as part of communicating using the MACsec protocol, a pair of security keys (e.g., comprising a transmit (Tx) key and a receive (Rx) key) are generated and used for encryption and decryption of traffic (e.g., network traffic communicated between the network devices via a MACsec communication link). For example, the Tx key (hereinafter "encryption key") may be used to encrypt the traffic and the Rx key (hereinafter "decryption key") may be used to decrypt the traffic. A new pair of security keys needs to be frequently generated in order to ensure that communication, via the MACsec communication link between the network devices, remains secured. Generating the new pair of security keys (as discussed above) may be referred to as an encryption key rollover.

As an example, as part of the encryption key rollover, a key server network device (one of the network devices) generates a new pair of security keys that includes a new decryption key and a new encryption key. The key server network device initiates (e.g., using a MACsec daemon of the key server network device) an installation of the new decryption key on the key server network device. After the installation, the key server network device sends the new decryption key to a peer network device (another one of the network devices). The peer network device initiates (e.g., using a MACsec daemon of the peer network device) an installation of the new decryption key on the peer network device.

After the installation of the new decryption key, the peer network device sends (to the key server network device) a first acknowledgment indicating that the peer network device has initiated installation of the new decryption key. Based on receiving the first acknowledgment, the key server network device initiates (e.g., using the MACsec daemon of the key server network device) an installation of the new encryption key on the key server network device. After initiating the installation of the new encryption key, the key server network device sends the new encryption key to the peer network device. Typically, after expiration of a predetermined time period (e.g., associated with the MACsec protocol) following transmission of the new encryption key to the peer network device, the key server network device encrypts new traffic using the new encryption key. Alternatively, the key server network device encrypts the new traffic using the new encryption key after the key server network device has encrypted a threshold quantity of packets using an existing encryption key.

In other words, the key server network device encrypts the new traffic using the new encryption key without receiving any indication, from the peer network device, that the peer network device has initiated installation of the new encryption key (e.g., because the installation of the new decryption key has not been initiated). Until the new encryption key is installed, the peer network device will continue to utilize an existing decryption key (instead of utilizing the new decryption key). In such instances, the peer network device may receive the new traffic (e.g., encrypted using the new encryption key) from the key server network device and may be unable to decrypt the new traffic (e.g., because the peer network device is not utilizing the new decryption key).

The inability to decrypt the new traffic results in packet loss. Thus, current techniques for encryption key rollover waste computing resources (e.g., processing resources, memory resources, communication resources, and/or the like), network resources, and/or other resources associated with attempting to recover lost packets, retransmitting the lost packets, reconfiguring the key server network device and/or the peer network device to prevent additional lost packets, among other examples.

Some implementations described herein relate to a network device that prevents packet loss during timer-based encryption key rollover (e.g., an encryption key rollover that occurs periodically). For example, a key server network device may install, on the key server network device, a new decryption key based on a timer-based key rollover setting and may provide, to peer network devices, first messages identifying the new decryption key. The new decryption key may be included in a pair of security keys that includes a new encryption key.

Prior to installing the new decryption key, the key server network device may utilize an original pair of security keys that includes an original decryption key and an original encryption key. The key server network device may continue to utilize the original encryption key, to encrypt traffic, until all of the peer network devices provide acknowledgements of installation of the new decryption key (instead of utilizing the new encryption key after the predetermined time period as described above). The key server network device may be configured to utilize the original encryption key based on the timer-based key rollover setting.

In some implementations, the timer-based key rollover setting may additionally configure the key server network device to continue utilizing the original encryption key (instead of using the new encryption key as described above) to encrypt traffic until all of the peer network devices provide acknowledgements of the installation of the new encryption key. By utilizing the original encryption key in this manner, the key server network device may prevent packet loss during timer-based encryption key rollover. While the configuration of the key server network device is applicable for timer based key rollover scenarios, the configuration of the key server network device is to be applied over and above existing timer-based key rollover configurations. The key server network device may be configured to wait (e.g., after expiration of the predetermined time period discussed above) for all of the peer network devices to install the new decryption key before utilizing the new encryption key to encrypt the traffic. By waiting for the acknowledgments before utilizing the new encryption key (as described herein), the key server network device may reduce a likelihood of the peer network devices being unable to decrypt the traffic (e.g., due to the peer network devices using the original decryption key) and may guarantee near zero packet loss.

Accordingly, by waiting for the acknowledgments before utilizing the new encryption key as described herein, the key server network device conserves computing resources, networking resources, and/or other resources that would otherwise have been consumed by attempting to recover lost packets, by retransmitting the lost packets, by reconfiguring the key server network device and/or the peer network devices, among other examples. Additionally, the key server network device may generate an alarm when one or more of the peer network devices fail to provide an acknowledgement of the installation of the new decryption key after the predetermined time period. In some implementations, the alarm may include information indicating that the key server network device is waiting for the acknowledgement of the installation of the new decryption key and information identifying the one or more peer network devices. The alarm may be provided to a device to cause the device (or a user of the device) to determine whether the one or more peer network devices are experiencing a failure.

FIGS. 1A-1F are diagrams of an example 100 associated with preventing packet loss during timer-based encryption key rollover. As shown in FIGS. 1A-1F, example 100 includes a server device communicating with an endpoint device via a network that includes network devices. The server device may include a laptop computer, a tablet computer, a desktop computer, a group of server devices, or a similar type of device. The endpoint device may include a mobile phone (e.g., a smart phone or a radiotelephone), a laptop computer, a tablet computer, a desktop computer, and/or the like. Although FIGS. 1A-1F describe the server device interacting with the endpoint device, in some implementations, the server device may interact with additional endpoint devices in a similar manner.

One or more of the network devices may include a router, a gateway, a switch, a firewall, a hub, a bridge, a reverse proxy, a server, an endpoint device, among other examples. In some implementations, the network devices may include a key server network device and multiple peer network devices. In some examples, the key server network device may generate one or more pairs of security keys (e.g., each pair including an encryption key and a decryption key) and may provide the one or more pairs of security keys to the peer network devices.

In some examples, the key server network device may communicate with the peer network devices using a media access control security (MACsec) protocol. For example, the key server network device and the peer network devices may communicate periodically (e.g., every millisecond, every second, among other examples) via MACsec Key Agreement (MKA) control messages. In some examples, the key server network device may communicate with the peer network devices via a link (e.g., a MACsec communication link). In some implementations, the key server network device may communicate with the peer network devices based on information identifying the peer network devices (e.g., information identifying network address of the peer network devices). In some examples, the information identifying the peer network devices may be stored in a memory associated with the key server network device. Although FIGS. 1A-1F describe the key server network device interacting with three network devices, in some implementations, the key server network device may interact with additional or fewer peer network devices in a similar manner.

As shown in FIG. 1, the server device may cause traffic (e.g., one or more packets) to be forwarded toward the endpoint device. The server device may cause the traffic to be forwarded periodically (e.g., every millisecond, every ten milliseconds, among other examples), may cause the traffic to be forwarded based on a trigger (e.g., based on the endpoint device connecting to the network), may cause the traffic to be forwarded based on a request by the endpoint device, among other examples.

As shown in FIG. 1A, and by reference number 105, the key server network device may encrypt the traffic utilizing an original pair of security keys including an original decryption key (Rx key) and an original encryption key (Tx key) and may transmit the encrypted traffic. For example, the key server network device may receive the traffic and encrypt the traffic to generate the encrypted traffic. Assume that the original pair of security keys (e.g., including the original decryption key and the original encryption key) has been installed on the key server network device. The key server network device may encrypt the traffic using the original encryption key (of the original pair of security keys) to generate the encrypted traffic. The key server network device may cause the encrypted traffic to be forwarded toward the peer network devices. In some examples, the key server network device may cause a first portion of the encrypted traffic to be forwarded toward a first peer network device of the peer network devices, cause a second portion of the encrypted traffic to be forwarded toward a second peer network device of the peer network devices, and so on.

As shown in FIG. 1A, the peer network devices may receive the encrypted traffic. Assume that the original pair of security keys (e.g., the original decryption key and the original encryption key) has been installed on the peer network devices. The peer network devices may use the original decryption key to decrypt the encrypted traffic to obtain the traffic (e.g., to obtain decrypted traffic). As shown in FIG. 1A, the peer network devices may cause the traffic (e.g., the decrypted traffic) to be forwarded toward the endpoint device. For example, the peer network devices may analyze the traffic to identify a destination address (e.g., a network address) associated with the endpoint device and may cause the traffic to be forward toward the destination address. For instance, the first peer network device may cause a first portion of the decrypted traffic to be forwarded toward the endpoint device, the second peer network device may cause a second portion of the decrypted traffic to be forwarded toward the endpoint device, and so on.

Figure 1B:
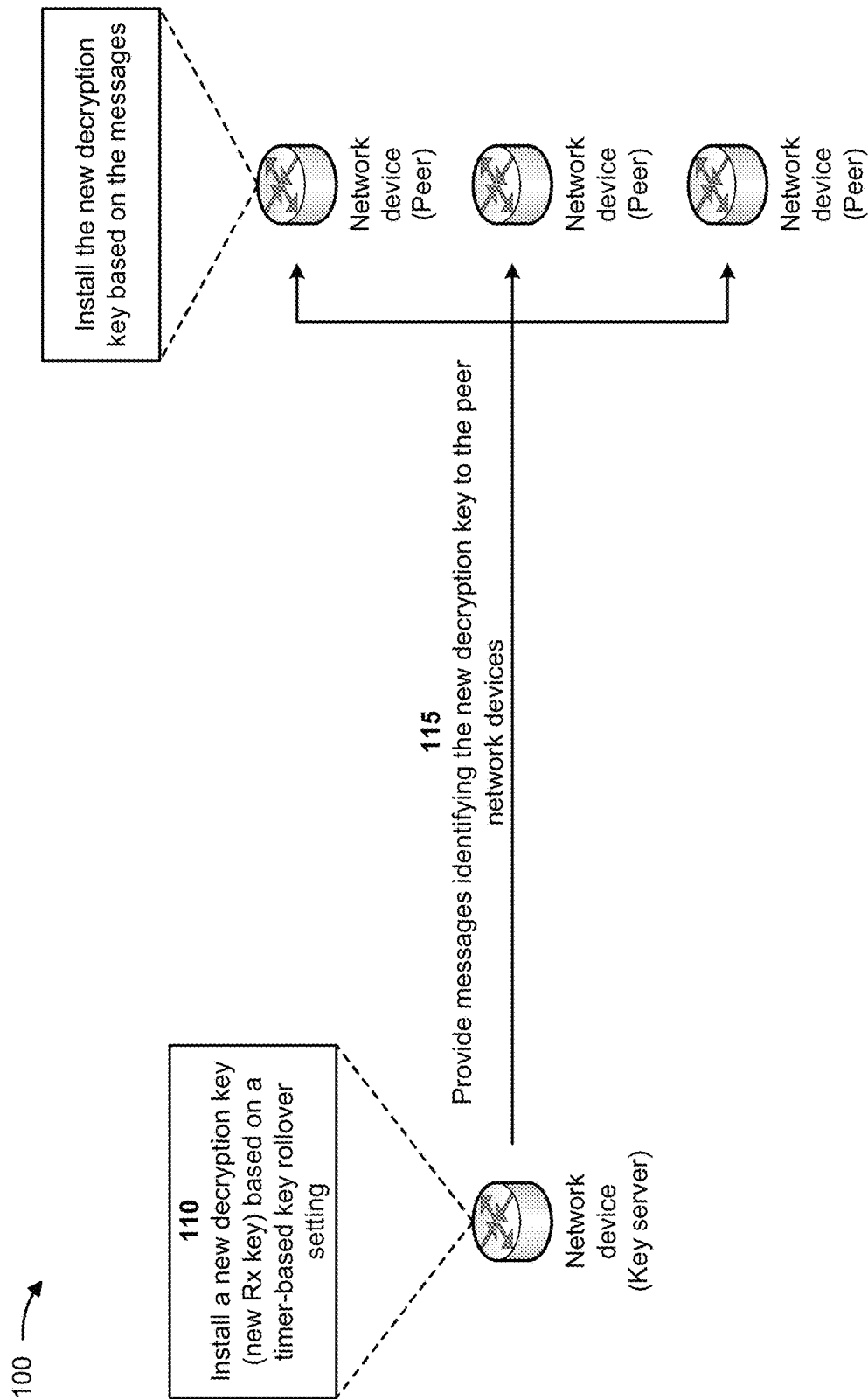

As shown in FIG. 1B, and by reference number 110, the key server network device may install a new decryption key (new Rx key) based on a timer-based key rollover setting. In some implementations, the key server network device may install the new decryption key after causing the encrypted traffic to be routed toward the peer network devices. In some implementations, the key server network device may receive the timer-based key rollover setting from a device associated with a user (e.g., an administrator of the key server network device, an administrator of the network, among other example). The device (hereinafter referred to "administrator device") may include another network device, another endpoint device, among other examples. The key server network device may receive the timer-based key rollover setting prior to installing the new decryption key.

In some implementations, the timer-based key rollover setting may include information identifying a frequency associated with an encryption key rollover (e.g., a frequency associated with generating new pairs of security keys). As an example, the information identifying the frequency associated with the encryption key rollover may indicate that a new pair of security keys is to be generated (e.g., by the key server network device) every thirty seconds, every minute, among other examples. The frequency associated with the key rollover may ensure that communication, between the key server network device and the peer network devices, remains secure.

In some implementations, the timer-based key rollover setting may be user configurable. For example, the frequency associated with the encryption key rollover may be configured via the administrator device. In some implementations, the key server network device may determine whether a timer, associated with the frequency (associated with the encryption key rollover), has expired. Expiration of the timer may provide an indication that a new pair of security keys is to be generated. In some implementations, the timer-based key rollover setting may additionally configure the key server network device to continue utilizing the original pair of security keys, as described below.

Assume that the timer was initiated when the original pair of security keys was generated. Further assume that the key server network device determines that the timer has expired. Based on determining that the timer has expired, the key server network device may generate a new pair of security keys that includes the new decryption key and a new encryption key and may install the new decryption key on the key server network device. In some examples, the key server network device may install the new decryption key using a MACsec daemon of the key server network device. In some implementations, another device (e.g., the administrator device) may generate the new pair of security keys and may provide the new pair of security keys to the key server network device for installation on the key server network device.

As shown in FIG. 1B, and by reference number 115, the key server network device may provide messages identifying the new decryption key to the peer network devices. For example, after installing the new decryption key, the key server network device may provide messages identifying the new decryption key to the peer network devices. In some implementations, the messages may include MKA control messages. In some examples, the key server network device may provide a message to the first peer network device, provide a message to the second peer network device, and so on. In some implementations, a message may include information identifying the new decryption key, may include the new decryption key, and/or may include information instructing a respective peer network device to install the new decryption key.

As shown in FIG. 1B, the peer network devices may install the new decryption key based on the messages. In some examples, each peer network device may install the new encryption key. Alternatively, one or more of the peer network devices may install the new encryption key. For example, the first peer network device may install the new decryption key on the first peer network device using a MACsec daemon of the first peer network device.

Figure 1C:
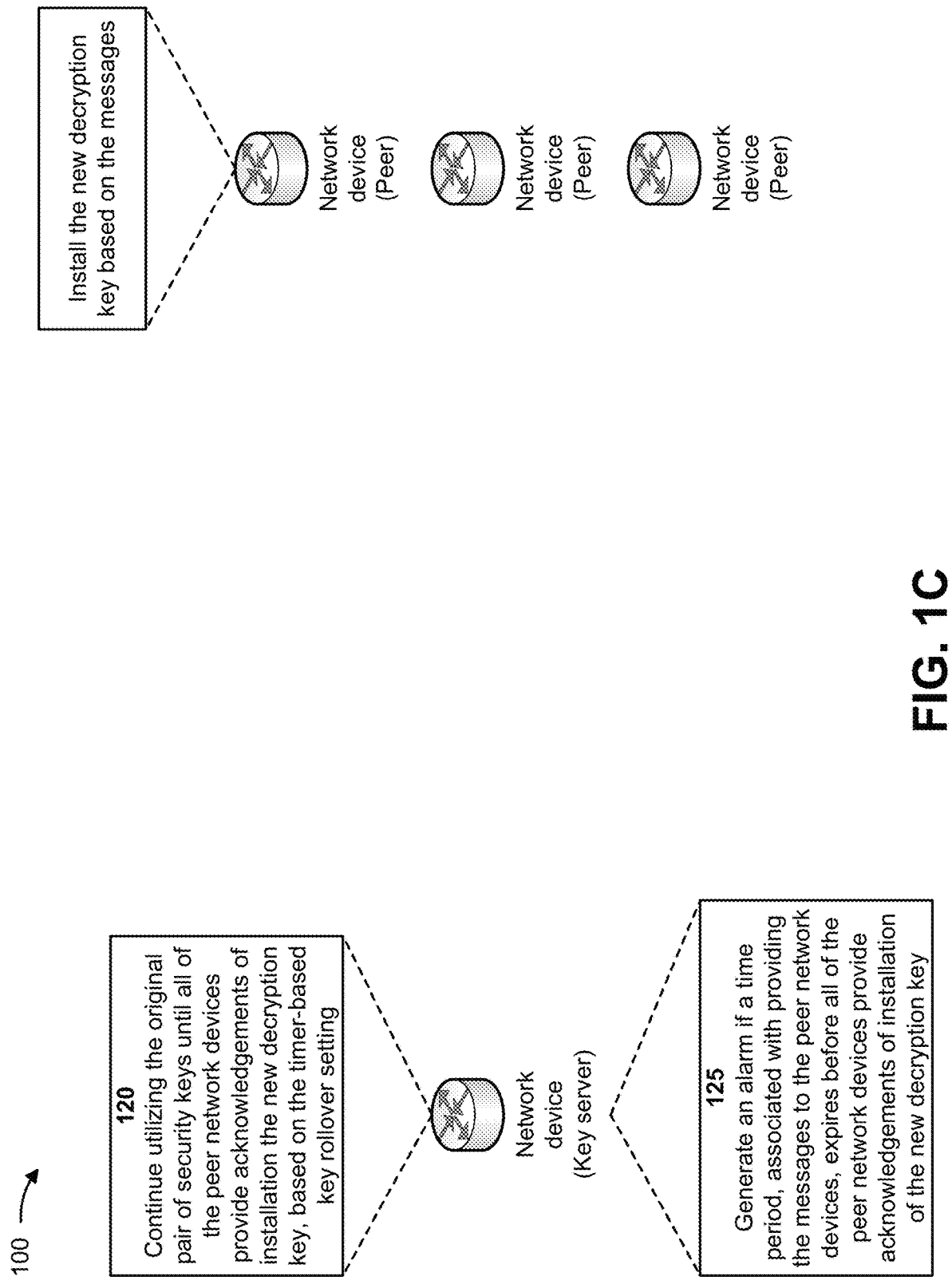

As shown in FIG. 1C, and by reference number 120, the key server network device may continue utilizing the original pair of security keys until all of the peer network devices provide acknowledgements of installation of the new decryption key, based on the timer-based key rollover setting. For example, assume that the first peer network device provides (to the key server network device) an acknowledgment indicating installation of the new decryption key on the first peer network device. For instance, assume that, after installing the new decryption key, the first peer network device provides an acknowledgement message (e.g., indicating installation of the new decryption key on the first peer network device). In some implementations, the acknowledgement message may include an MKA control message. Further assume that the second peer network device has not provided (to the key server network device) an acknowledgment indicating installation of the new decryption key on the second peer network device.

The key server network device may determine that the acknowledgment (indicating the installation of the new decryption key) has not been received from the second peer network device. Accordingly, the key server network device may determine that all of the peer network devices have not provided acknowledgements of installation the new decryption key. The second peer network device may not provide the acknowledgment (indicating the installation of the new decryption key) for various reasons. For example, the second peer network device may not provide the acknowledgment because the second peer network device is performing a task that prevents the second peer network device from installing (or initiating installation of) the new decryption key, the second peer network device is performing a task that prevents the second peer network device from providing the acknowledgement after installing the new decryption key, the second peer network device is experiencing a failure that prevents the second peer network device from installing (or initiating installation of) the new decryption key, the second peer network device is experiencing a failure that prevents the second peer network device from providing the acknowledgement after installing the new decryption key, among other examples.

In some implementations, the timer-based key rollover setting may additionally configure the key server network device to continue utilizing the original pair of security keys based on determining that all of the peer network devices have not provided acknowledgements of installation the new decryption key (e.g., configure the key server network device in addition to one or more other configurations as discussed above). Accordingly, based on determining that all of the peer network devices have not provided acknowledgements of installation the new decryption key, the key server network device may continue utilizing the original pair of security keys. In some examples, based on determining that the second peer network device has not provided the acknowledgment, the key server network device may determine that the second peer network device may be utilizing the original decryption key (instead of utilizing the new decryption key). Accordingly, the key server network device may continue utilizing the original encryption key to encrypt traffic.

As shown in FIG. 1C, and by reference number 125, the key server network device may generate an alarm if a time period, associated with providing the messages to the peer network devices, expires before all of the peer network devices provide acknowledgements of installation of the new decryption key. For example, the time period may be associated with transmitting the MKA control messages identifying the new decryption key. For instance, the time period may indicate a time interval (e.g., an amount of time) within which the key server network device is expected to receive (from all of the peer network devices) acknowledgements of installation the new decryption key (after the key server network device provides the messages to the peer network devices).

Assume that the administrator device has configured the timer-based key rollover setting to cause the key server network device to continue utilizing the original encryption key (as explained above) and to generate the alarm if the time period expires (as explained above), instead of the key server network device installing and utilizing the new encryption key after the time period expires. Assume that the key server network device determines that the time period has expired and that all of the peer network devices have not provided the acknowledgements of the installation of the new decryption key.

Based on determining that the time period has expired and that all of the peer network devices have not provided the acknowledgements, the key server network device may generate the alarm. In some implementations, the alarm may include information indicating that the key server network device is waiting for the acknowledgement (from the second peer network device) of installation of the new decryption key on the second peer network device, information indicating how long the key server network device has been waiting for the acknowledgement, information identifying the second peer network device, information indicating that the key server network device is ready to install the new encryption key and that the key server network device is continuing to utilize the original encryption key, information identifying peer network devices that have successfully installed the new decryption key, among other examples.

The key server network device may provide the alarm to the administrator device. For example, the key server network device may provide the alarm to the administrator device for display. The key server network device may continue utilizing the original encryption key after providing the alarm. For example, the key server network device may continue utilizing the original encryption key to encrypt traffic (e.g., because the second peer network device may be utilizing the original decryption key instead of utilizing the new decryption key).

By configuring the timer-based key rollover setting to cause the key server network device to generate the alarm and continue utilizing the original encryption key (as explained herein), the key server network device may reduce packet loss (e.g., reduce packet loss by the peer network devices). Accordingly, the key server network device conserves computing resources, networking resources, and/or other resources that would otherwise have been consumed by attempting to recover lost packets, retransmitting the lost packets, reconfiguring the key server network device and/or the peer network devices, among other examples.

Based on providing the alarm to the administrator device, the administrator device may identify the second peer network device and perform an analysis of the second peer network device (e.g., perform troubleshooting relating to the second peer network device) to determine one or more reasons associated with the second peer network device not providing the acknowledgement of installation of the new decryption key on the second peer network device. In some examples, the administrator device may determine one or more of the various reasons discussed above.

In some implementations, based on performing the analysis, the administrator device may determine that the key server network device is to not communicate with the second peer network device and may provide, to the key server network device, an indication (or an instruction) that the key server network device is to not communicate with the second peer network device (e.g., for a threshold amount of time). For example, the administrator device may provide an indication (or an instruction) that the key server network device is to not wait for the acknowledgement of installation of the new decryption key on the second peer network device, that the key server network device is to install and utilize the new encryption key to encrypt traffic, that the key server network device is to not provide encrypted traffic (encrypted using the new encryption key) to the second peer network device, among other examples.

In some examples, the threshold amount of time may be determined by the administrator device. In some implementations, based on receiving the indication, the key server network device may remove information identifying the second peer network device from the information identifying the peer network devices (e.g., stored in the memory associated with the key server network device).

In some implementations, the key server network device may perform the analysis of the second peer network device (e.g., perform troubleshooting relating to the second peer network device) and determine that the key server network device is to not communicate with the second peer network device, in a manner similar to the manner described above. In some examples, the key server network device may cause the second peer network device to reboot and may perform the actions described in FIGS. 1B-1D after the second peer network device reboots.

Figure 1D:
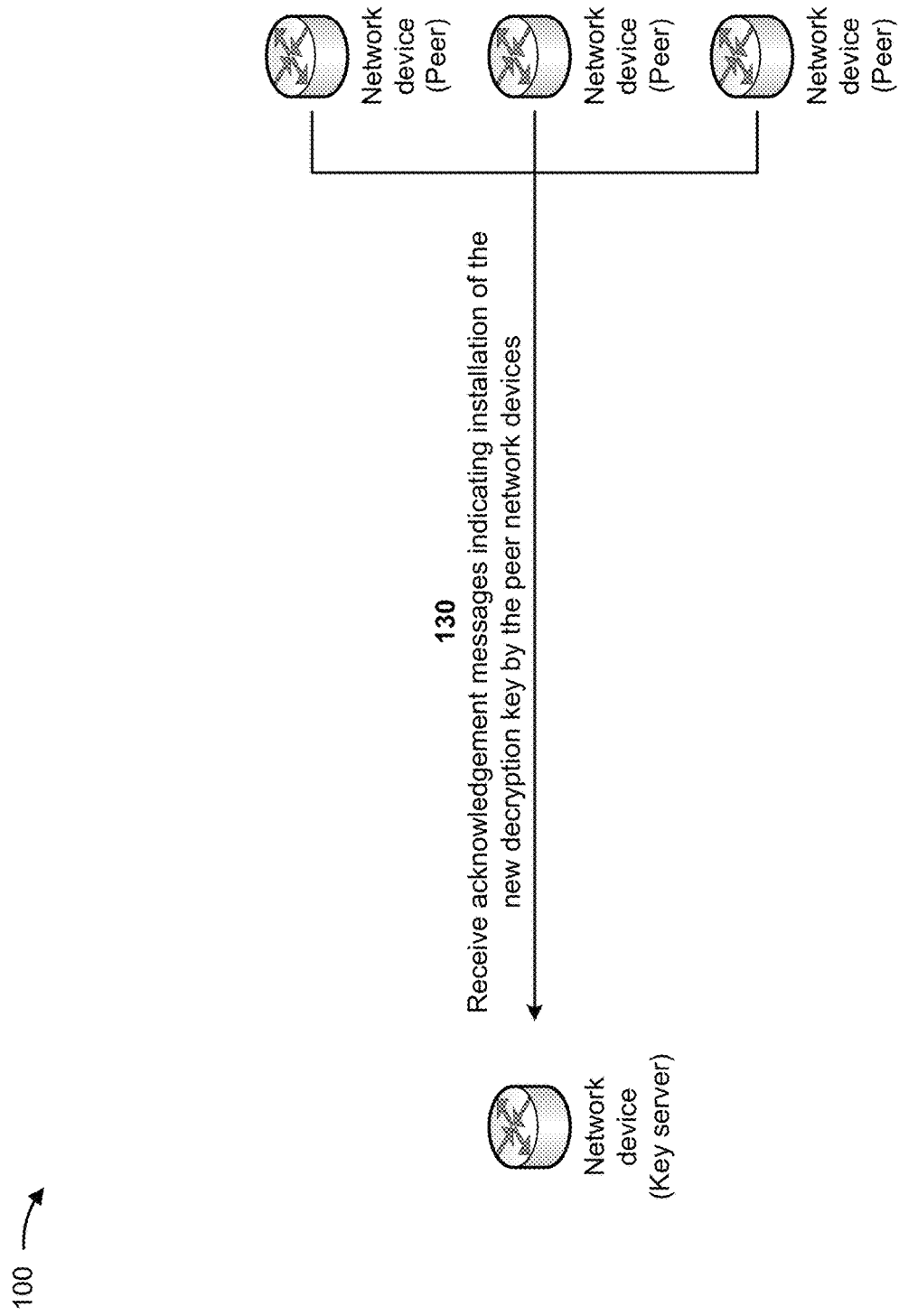

As shown in FIG. 1D, and by reference number 130, the key server network device may receive acknowledgement messages indicating installation of the new decryption key by the peer network devices. For example, the key server network device may receive the acknowledgement messages from all of the peer network devices with the exception of the second peer network device. In some implementations, the acknowledgement messages may include MKA control messages. In some examples, after installing the new decryption key, the peer network devices may provide the acknowledgement messages to the key server network device.

Based on the second peer network device being removed from consideration in light of the indication provided by the administrator device (as discussed above), the key server network device may determine that the acknowledgement messages have been received from all of the peer network devices (e.g., from a group of the peer network devices after the second peer network device has been removed from consideration). In some examples, the group of the peer network devices may include remaining peer network devices after the second peer network device has been removed from consideration, when one or more acknowledgement messages have not been received. In some examples, the group of the peer network devices may include all of the peer network devices, when the acknowledgement messages have been received from all of the peer network devices. Based on determining that the acknowledgement messages have been received from the group of the peer network devices, the key server network device may disable the alarm. For example, the key server network device may provide, to the administrator device, an indication that the acknowledgement messages have been received from the group of the peer network devices.

As shown in FIG. 1E, and by reference number 135, the key server network device may install the new encryption key (new Tx key) based on the acknowledgement messages. In some implementations, the key server network device may determine whether the acknowledgment messages have been received from the group of the peer network devices. Assume that the key server network device determines that the acknowledgment messages have been received from the group of the peer network devices. Based on determining that the acknowledgment messages have been received from the group of the peer network devices, the key server network device may install the new encryption key (included in the new pair of security keys) on the key server network device. In some examples, the key server network device may install the new encryption key using the MACsec daemon of the key server network device.

In some implementations, the key server network device may provide messages identifying the new encryption key to the peer network devices. For example, after installing the new encryption key, the key server network device may provide messages (identifying the new encryption key) to the group of the peer network devices, in a manner similar to the manner described above in connection with FIG. 1B. In some implementations, the peer network devices may install the new encryption key based on the messages identifying the new encryption key, in a manner similar to the manner described above in connection with FIG. 1B.

Figure 1F:
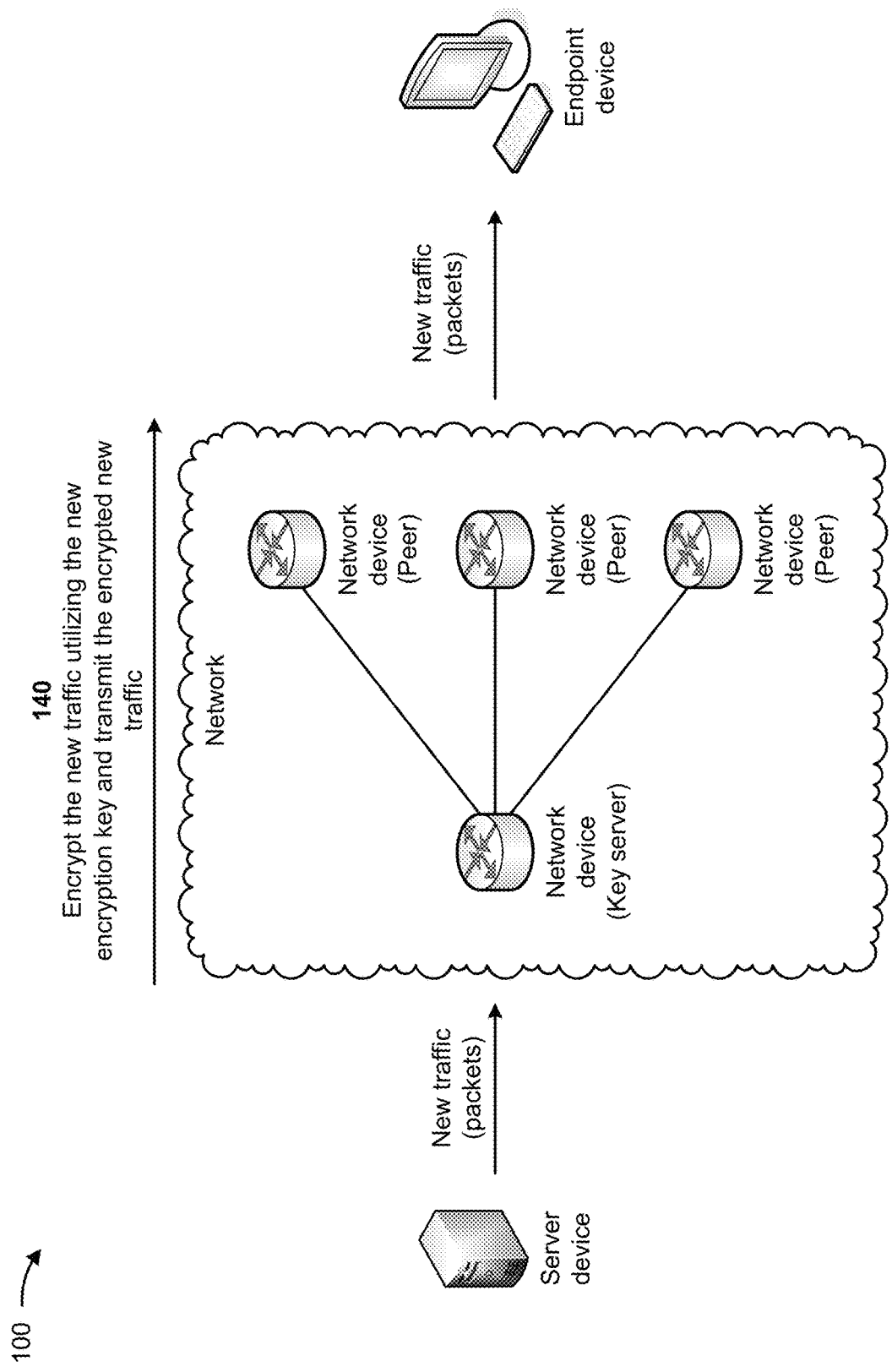

As shown in FIG. 1F, the server device may provide new traffic to the key server network device, in a manner similar to the manner described above in connection with FIG. 1A. For example, the key server network device may receive the new traffic (e.g., after the key server network device determines that the second acknowledgement messages have been received from the group of the peer network devices).

As shown in FIG. 1F, and by reference number 150, the key server network device may encrypt the new traffic utilizing the new encryption key. For example, based on determining that the second acknowledgement messages have been received from the group of the peer network devices, the key server network device may determine that the new encryption key is to be utilized (instead of continuing to utilize the original encryption key). Accordingly, the key server network device may utilize the new encryption key to encrypt the new traffic (received from the server device) and generate an encrypted new traffic. The key server network device may provide the encrypted new traffic to the group of the peer network devices, in a manner similar to the manner described above in connection with FIG. 1A.

As shown in FIG. 1F, the remaining peer network devices may receive the new encrypted traffic and use the new decryption key to decrypt the encrypted new traffic to obtain the new traffic, in a manner similar to the manner described above in connection with FIG. 1A. As shown in FIG. 1F, the group of the peer network devices may cause the new traffic to be forwarded toward the endpoint device, in a manner similar to the manner described above in connection with FIG. 1F.

By utilizing the original encryption key to encrypt traffic until all of the peer network devices provide acknowledgements of the installation of the new decryption key, the key server network device may reduce packet loss during timer-based encryption key rollover. Accordingly, by utilizing the original encryption key as described herein, the key server network device conserves computing resources, networking resources, and/or other resources that would otherwise have been consumed by attempting to recover lost packets, by retransmitting the lost packets, by reconfiguring the key server network device and/or the peer network devices, among other examples.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
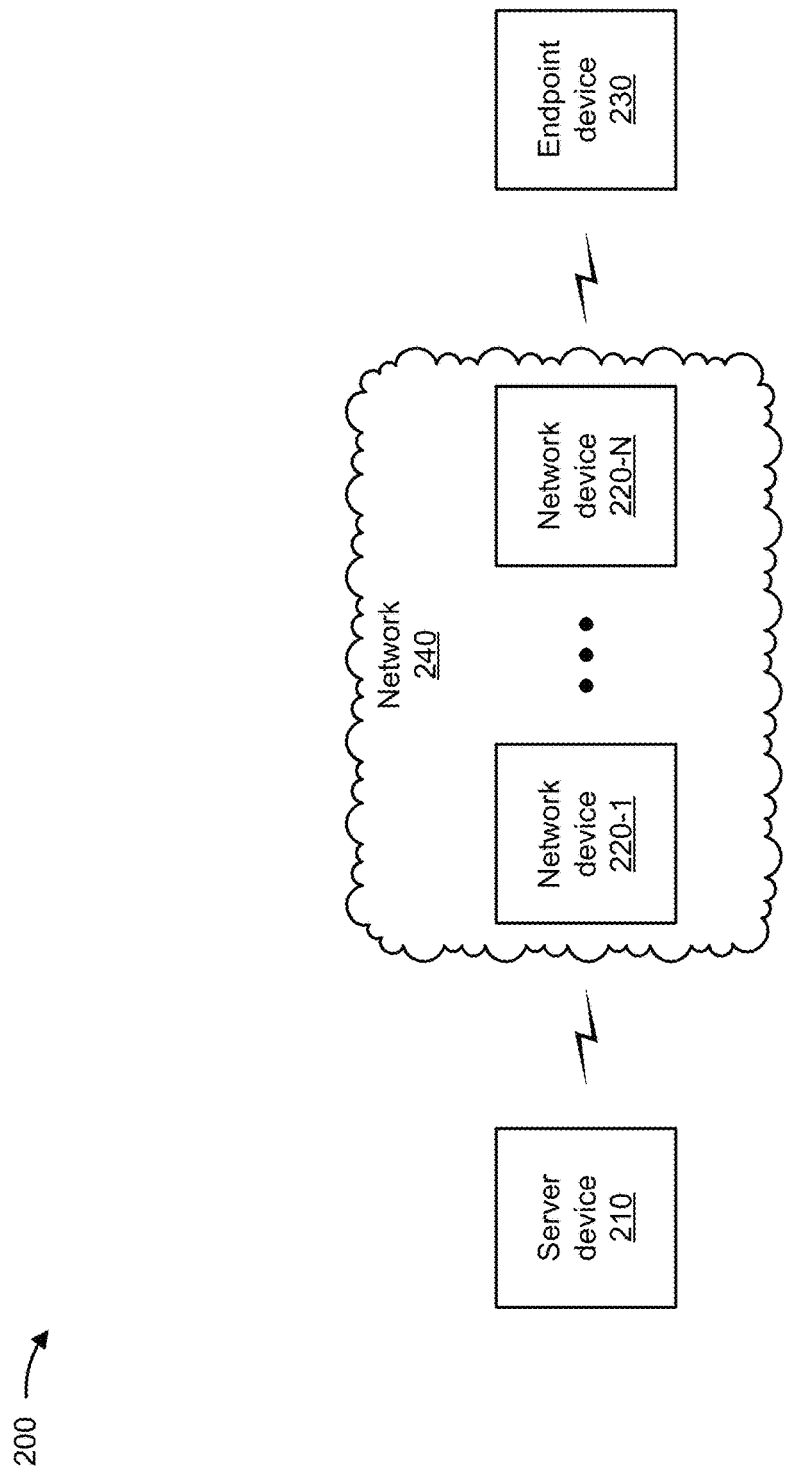
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a server device 210, a group of network devices 220 (shown as network device 220-1 through network device 220-N), an endpoint device 230, and a network 240. Devices of environment 200 may interconnect via wired connections, wireless connections, or a combination of wired and wireless connections.

Server device 210 includes one or more devices capable of receiving, generating, storing, processing, and/or providing information, such as information described herein. For example, server device 210 may include a laptop computer, a tablet computer, a desktop computer, a group of server devices, or a similar type of device. In some implementations, server device 210 may receive information from and/or transmit information (e.g., traffic) to endpoint device 230, via network 240 (e.g., by routing packets using network devices 220 as intermediaries).

Network device 220 includes one or more devices capable of receiving, processing, storing, routing, and/or providing traffic (e.g., a packet or other information or metadata) in a manner described herein. For example, network device 220 may include a router, such as a label switching router (LSR), a label edge router (LER), an ingress router, an egress router, a provider router (e.g., a provider edge router or a provider core router), a virtual router, or another type of router. Additionally, or alternatively, network device 220 may include a gateway, a switch, a firewall, a hub, a bridge, a reverse proxy, a server (e.g., a proxy server, a cloud server, or a data center server), a load balancer, and/or a similar device. In some implementations, network device 220 may be a key server network device, a peer network device, among other examples. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 240.

Endpoint device 230 includes one or more devices capable of receiving, generating, storing, processing, and/or providing information, such as information described herein. For example, endpoint device 230 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 230 may receive network traffic from and/or may provide network traffic to server device 210 and/or other endpoint devices 230, via network 240 (e.g., by routing packets using network devices 220 as intermediaries).

Network 240 includes one or more wired and/or wireless networks. For example, network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
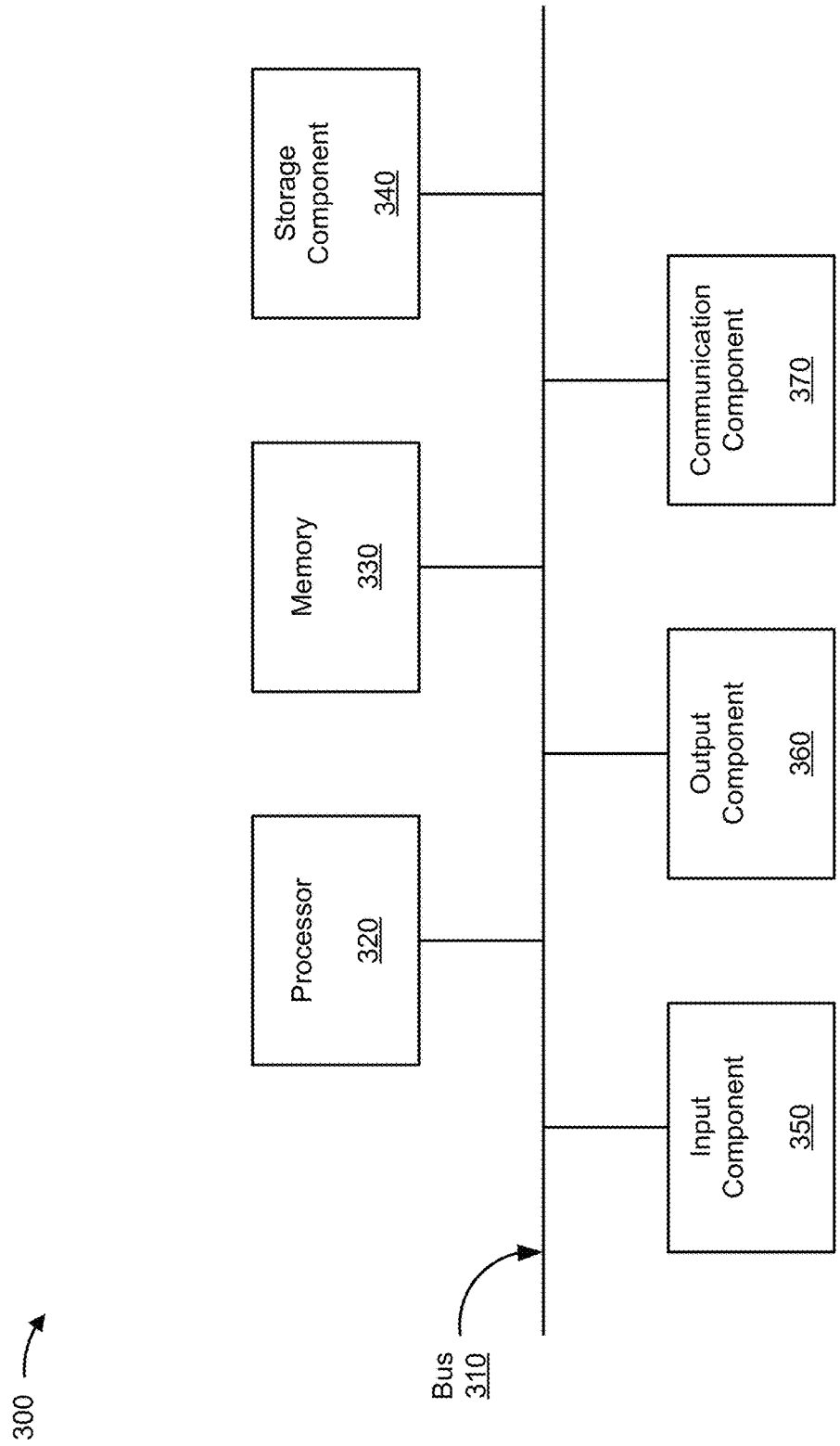
FIGS. 3 and 4 are diagrams of example components of one or more devices of FIG. 2.

FIG. 3 is a diagram of example components of one or more devices of FIG. 2. The example components may be included in a device 300, which may correspond to server device 210, network device 220, and/or endpoint device 230. In some implementations, server device 210, network device 220, and/or endpoint device 230 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
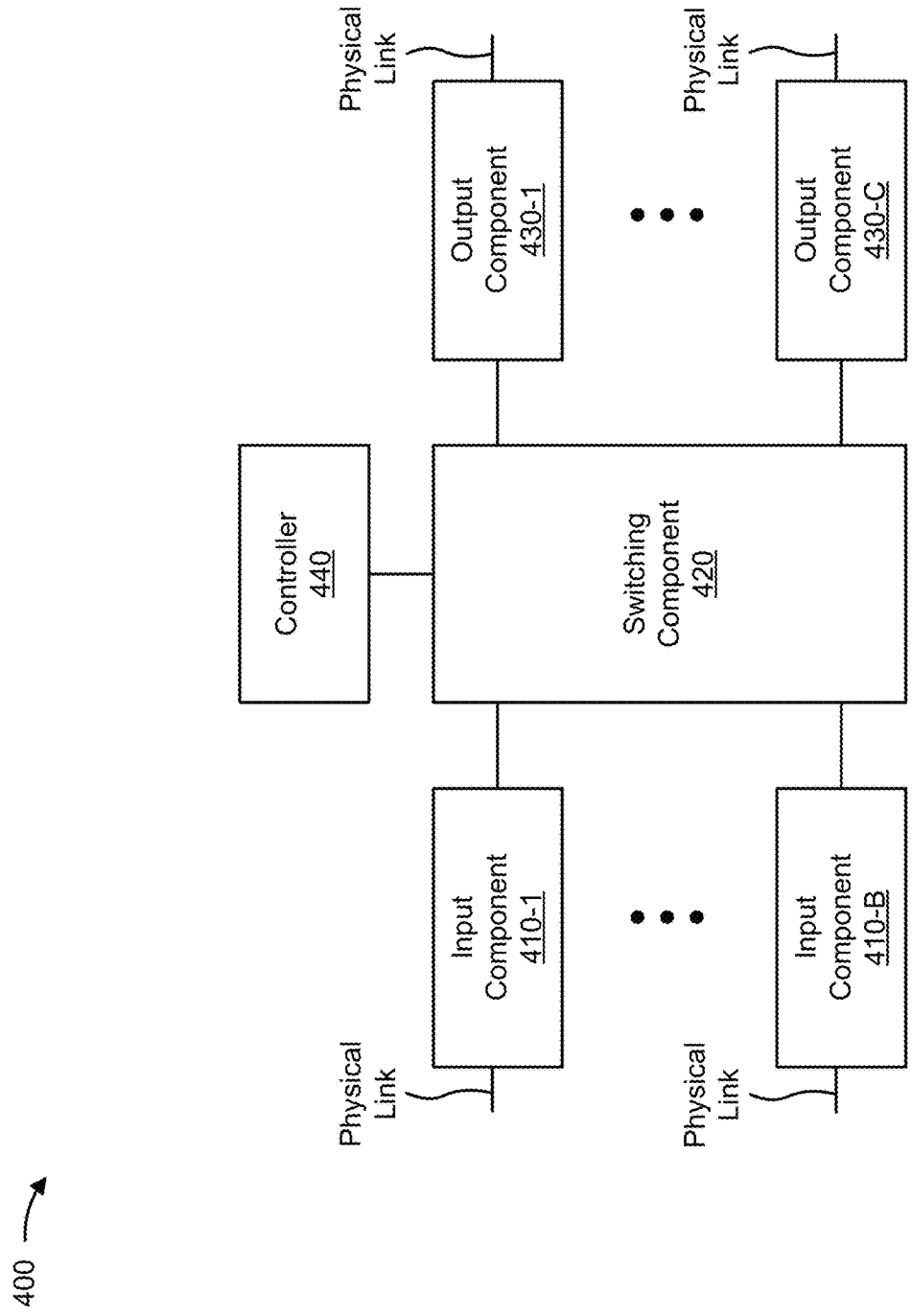

FIG. 4 is a diagram of example components of one or more devices of FIG. 2. The example components may be included in a device 400. Device 400 may correspond to network device 220. In some implementations, network device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
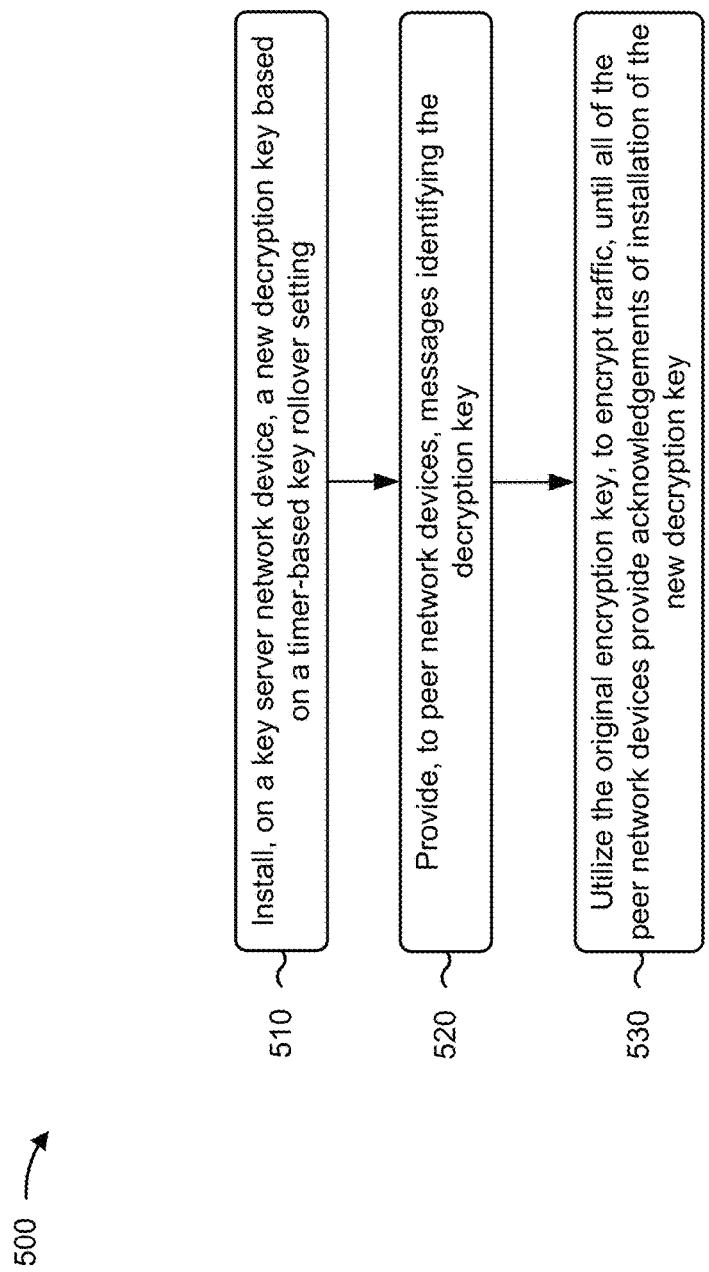
FIG. 5 is a flowchart of an example process for preventing packet loss during timer-based encryption key rollover.

FIG. 5 is a flowchart of an example process 500 for preventing packet loss during timer-based encryption key rollover. In some implementations, one or more process blocks of FIG. 5 may be performed by a network device (e.g., network device 220). In some implementations, one or more process blocks of FIG. 5 may be performed by another device or a group of devices separate from or including the device, such as a server device (e.g., server device 210) and/or an endpoint device (e.g., endpoint device 230). Additionally, or alternatively, one or more process blocks of FIG. 5 may be performed by one or more components of device 300, such as processor 320, memory 330, storage component 340, input component 350, output component 360, and/or communication component 370. Additionally, or alternatively, one or more process blocks of FIG. 5 may be performed by one or more components of device 400, such as input component 410, switching component 420, output component 430, and/or controller 440.

As shown in FIG. 5, process 500 may include installing, on a key server network device, a new decryption key based on a timer-based key rollover setting (block 510). For example, the key server network device may install, on a key server network device, a new decryption key based on a timer-based key rollover setting, as described above. In some implementations, the timer-based key rollover setting is user configurable.

In some implementations, the new decryption key is included in a pair of security keys that includes a new encryption key. In some implementations, prior to installing the new decryption key, the key server network device utilizes an original pair of security keys that includes an original decryption key and an original encryption key.

As further shown in FIG. 5, process 500 may include providing, to peer network devices, messages identifying the new decryption key (block 520). For example, the key server network device may provide, to peer network devices, messages identifying the new decryption key, as described above. In some implementations, the key server network device communicates with the peer network devices via a media access control security protocol. In some implementations, the time period is associated with a media access control security key agreement transmit time interval. In other words, the time period is associated with a time interval (e.g., an amount of time) within which the key server network device is to receive (from all of the peer network devices) acknowledgements of installation of the new decryption key after the key server network device provides (to the peer network devices) MKA control messages identifying the new decryption key. In some implementations, process 500 includes receiving the timer-based key rollover setting prior to installing the new decryption key.

In some implementations, process 500 includes determining that a time period, associated with providing the messages to the peer network devices, expires before all of the peer network devices provide acknowledgements of installation of the new decryption key; identifying, based on expiration of the time period, one or more peer network devices that failed to install the new decryption key; and removing the one or more peer network devices from association with the key server network device.

As further shown in FIG. 5, process 500 may include utilizing the original encryption key, to encrypt traffic, until all of the peer network devices provide acknowledgements of installation of the new decryption key (block 530). For example, the key server network device may utilize the original encryption key, to encrypt traffic, until all of the peer network devices provide acknowledgements of installation of the new decryption key, the key server network device being configured to utilize the original encryption key based on the timer-based key rollover setting, as described above.

In some implementations, the key server network device may receive the timer-based key rollover setting (e.g., prior to installing the new decryption key). The timer-based key rollover setting may additionally configure the key server network device to continue to utilize the original decryption key, to encrypt traffic, until all of the peer network devices provide acknowledgements of installation of the new decryption key. In some implementations, utilizing the original decryption key and the original encryption key, to encrypt traffic, until all of the peer network devices provide acknowledgements of installation of the new decryption key includes determining that a time period, associated with providing the messages to the peer network devices, expires before all of the peer network devices provide acknowledgements of installation of the new decryption key, and utilizing the original decryption key and the original encryption key, to encrypt traffic, after expiration of the time period.

In some implementations, process 500 includes generating an alarm when a time period, associated with providing the messages to the peer network devices, is satisfied before all of the peer network devices provide acknowledgements of installation of the new decryption key. In some implementations, process 500 includes providing the alarm for display, wherein the alarm includes information indicating that the key server network device is waiting for acknowledgement of installation of the new decryption key by one or more peer network devices, and information identifying the one or more peer network devices.

In some implementations, process 500 includes receiving acknowledgement messages indicating installation of the new decryption key by all of the peer network devices, and disabling the alarm based on receiving the acknowledgement messages.

In some implementations, process 500 includes identifying, based on not receiving acknowledgements of installation of the new decryption key from all of the peer network devices, one or more peer network devices that failed to install the new decryption key, and removing the one or more peer network devices from association with the key server network device.

In some implementations, process 500 includes receiving acknowledgement messages indicating installation of the new decryption key by all of the peer network devices; receiving new traffic to be provided to one or more peer network devices; utilizing, based on the acknowledgement messages, the new encryption key to encrypt the new traffic and generate encrypted traffic; and providing the encrypted traffic to the one or more peer network devices.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    installing, on a key server network device, a new decryption key based on a timer-based key rollover setting,
        wherein the new decryption key is included in a pair of security keys that includes a new encryption key, and
        wherein, prior to installing the new decryption key, the key server network device utilizes an original pair of security keys that includes an original decryption key and an original encryption key;
    providing, by the key server network device and to peer network devices, messages identifying the new decryption key;
    utilizing, by the key server network device, the original encryption key, to encrypt traffic, until all of the peer network devices provide acknowledgements of installation of the new decryption key,
        wherein the key server network device is configured to utilize the original encryption key based on the timer-based key rollover setting;
    receiving, by the key server network device, acknowledgement messages,
        wherein the acknowledge messages comprise the acknowledgements of installation of the new decryption key;
    receiving, by the key server network device, new traffic to be provided to one or more peer network devices of the peer network devices;
    utilizing, by the key server network device and based on the acknowledgement messages, the new encryption key to encrypt the new traffic and generate encrypted traffic; and
    providing, by the key server network device, the encrypted traffic to the one or more peer network devices.

2. The method of claim 1, further comprising:
    generating an alarm when a time period, associated with providing the messages to the peer network devices, expires before all of the peer network devices provide the acknowledgements of installation of the new decryption key.

3. The method of claim 2, further comprising:
    disabling the alarm based on receiving the acknowledgement messages.

4. The method of claim 2, further comprising:
    identifying, based on not receiving acknowledgements of installation of the new decryption key from all of the peer network devices, one or more peer network devices that failed to install the new decryption key; and
    removing the one or more peer network devices that failed to install the new decryption key from association with the key server network device.

5. The method of claim 2, further comprising:
    providing the alarm for display,
        wherein the alarm includes:
            information indicating that the key server network device is waiting for the acknowledgements of installation of the new decryption key, and
            information identifying the one or more peer network devices.

6. The method of claim 1, further comprising:
    determining that a time period, associated with providing the messages to the peer network devices, expires before all of the peer network devices provide acknowledgements of installation of the new decryption key;
    identifying, based on expiration of the time period, one or more peer network devices that failed to install the new decryption key; and
    removing the one or more peer network devices from association with the key server network device.

7. The method of claim 1, wherein utilizing the original encryption key, to encrypt traffic, until all of the peer network devices provide the acknowledgements of installation of the new decryption key comprises:
    determining that a time period, associated with providing the messages to the peer network devices, expires before all of the peer network devices provide the acknowledgements of installation of the new decryption key; and
    utilizing the original encryption key, to encrypt traffic, after expiration of the time period.

8. A key server network device, comprising:
    one or more memories; and
    one or more processors to:
        install, on the key server network device, a new decryption key based on a timer-based key rollover setting, wherein the new decryption key is included in a pair of security keys that includes a new encryption key, and wherein, prior to installing the new decryption key, the key server network device utilizes an original pair of security keys that includes an original decryption key and an original encryption key;

provide, to peer network devices, messages identifying the new decryption key;

utilize the original encryption key, to encrypt traffic, until all of the peer network devices provide acknowledgements of installation of the new decryption key, wherein the key server network device is configured to utilize the original encryption key based on the timer-based key rollover setting;

receive acknowledgement messages;

wherein the acknowledge messages comprise the acknowledgements of installation of the new decryption key;

receive new traffic to be provided to one or more peer network devices;

utilize, based on the acknowledgement messages, the new encryption key to encrypt the new traffic and generate new encrypted traffic; and provide the new encrypted traffic to the one or more peer network devices.

9. The key server network device of claim 8, wherein the one or more processors are further to:

determine that a time period, associated with providing the messages to the peer network devices, expires before all of the peer network devices provide the acknowledgement messages;

identify, based on expiration of the time period, one or more peer network devices that failed to install the new decryption key; and remove the one or more peer network devices from association with the key server network device.

10. The key server network device of claim 8, wherein the timer-based key rollover setting is user configurable.

11. The key server network device of claim 8, wherein the one or more processors, to utilize the original encryption key, to encrypt traffic, until all of the peer network devices provide acknowledgements of installation of the new decryption key, are to:

determine that a time period, associated with providing the messages to the peer network devices, expires before all of the peer network devices provide the acknowledgements of installation of the new decryption key; and utilize the original encryption key, to encrypt traffic, after expiration of the time period.

12. The key server network device of claim 11, wherein the time period is associated with a media access control security key agreement transmit time interval.

13. The key server network device of claim 8, wherein the one or more processors are further to:

receive the timer-based key rollover setting prior to installing the new decryption key.

14. The key server network device of claim 8, wherein the key server network device communicates with the peer network devices via a media access control security protocol.

15. A non-transitory computer-readable medium storing a set of instructions, the set of instructions comprising:

one or more instructions that, when executed by one or more processors of a key server network device, cause the key server network device to:

install, on the key server network device, a new decryption key based on a timer-based key rollover setting, wherein the new decryption key is included in a pair of security keys that includes a new encryption key, and wherein, prior to installing the new decryption key, the key server network device utilizes an original pair of security keys that includes an original decryption key and an original encryption key;

provide, to peer network devices, messages identifying the new decryption key;

utilize the original encryption key, to encrypt traffic, until all of the peer network devices provide acknowledgements of installation of the new decryption key, wherein the key server network device is configured to utilize the original encryption key based on the timer-based key rollover setting;

receive acknowledgement messages, wherein the acknowledge messages comprise the acknowledgements of installation of the new decryption key;

receive new traffic to be provided to one or more peer network devices of the peer network devices;

utilize, based on the acknowledgement messages, the new encryption key to encrypt the new traffic and generate encrypted traffic; and provide the encrypted traffic to the one or more peer network devices.

16. The non-transitory computer-readable medium of claim 15, wherein the one or more instructions further cause the key server network device to:

receive acknowledgement messages indicating installation of the new decryption key by all of the peer network devices; and disable an alarm based on the acknowledgement messages.

17. The non-transitory computer-readable medium of claim 15, wherein the one or more instructions further cause the key server network device to:

identify, based on not receiving acknowledgements of installation of the new decryption key from all of the peer network devices, one or more peer network devices that failed to install the new decryption key; and remove the one or more peer network devices that failed to install the new decryption key from association with the key server network device.

18. The non-transitory computer-readable medium of claim 15, wherein the one or more instructions further cause the key server network device to:

provide an alarm for display, wherein the alarm includes:

information indicating that the key server network device is waiting for the acknowledgements of installation of the new decryption key, and information identifying the one or more peer network devices.

19. The non-transitory computer-readable medium of claim 15, wherein the one or more instructions further cause the key server network device to:

receive the traffic prior to installing the new decryption key;

encrypt the traffic, utilizing the original encryption key, to generate encrypted traffic; and provide the encrypted traffic to the one or more peer network devices.

20. The non-transitory computer-readable medium of claim 15, wherein the one or more instructions further cause the key server network device to:

generate an alarm when a time period, associated with providing the messages to the peer network devices, expires before all of the peer network devices provide the acknowledgements of installation of the new decryption key.

* * * * *